United States Patent
Bai et al.

(10) Patent No.: US 8,803,822 B2
(45) Date of Patent: Aug. 12, 2014

(54) TIME-REVERSAL-BASED IMPACT-LOCALIZATION AND HAPTIC-FEEDBACK METHOD FOR TOUCH PANELS

(75) Inventors: Mingsian R. Bai, Hsinchu (TW); Yao Kun Tsai, Taoyuan County (TW)

(73) Assignee: National Chiao Tung University, Hsinchu (TW)

( * ) Notice: Subject to any disclaimer, the term of this patent is extended or adjusted under 35 U.S.C. 154(b) by 559 days.

(21) Appl. No.: 13/030,322

(22) Filed: Feb. 18, 2011

(65) Prior Publication Data

US 2012/0113020 A1 May 10, 2012

(30) Foreign Application Priority Data

Nov. 9, 2010 (TW) .............................. 99138516 A (51) Int. Cl.
*G08B 6/00* (2006.01)
(52) U.S. Cl.
USPC .......................................................... 345/173
(58) Field of Classification Search
CPC ................................ G06F 3/016; G06F 3/043
USPC ................................................. 345/173–179
See application file for complete search history.

(56) References Cited

U.S. PATENT DOCUMENTS

2006/0262104 A1* 11/2006 Sullivan et al. ............... 345/177
2010/0013783 A1   1/2010 St. Pierre

FOREIGN PATENT DOCUMENTS

TW           201009669 A      3/2010

OTHER PUBLICATIONS

D.T. Pham, M Al-Kutubi, M. Yang, Z. Wang, Z. Ji; Pattern Matching for Tangible Acoustic Interfaces; Intelligent Production Machines and Systems, 2006 Cardiff University, Published by Elsevier Ltd., pp. 556-561.
D.T. Pham Z. Ji, O. Peyroutet, M. Yang, Z. Wang, M. Al-Kutubi; Localisation of Impacts on Solid Objects Using the Wavelet Transform and Maximum Likelihood Estimation; Intelligent Production Machines and Systems, 2006 Cardiff University, Published by Elsevier Ltd., pp. 541-547.
Ros Kiri Ing, Nicholas Quieffin, Stefan Catheline, Mathias Fink, In Solid Localization of Finger Impacts Using Acoustic Time-Reversal Process, Applied Physics Letters 87, 204104 (2005).

* cited by examiner

*Primary Examiner* — Amare Mengistu
*Assistant Examiner* — Jennifer Zubajlo
(74) *Attorney, Agent, or Firm* — Rosenberg, Klein & Lee (57) ABSTRACT

The present invention provides a time-reversal-based impact-localization and haptic-feedback method for touch panels. Firstly, a plate model for an elastic plate and the impulse responses thereof are constructed according a plate theory. Next, a mathematical model is established according to the impulse responses and a time-reversal approach. When an impact force hits the elastic plate, the touched point on the elastic plate generates a touch signal, and the touch signal is received by at least a sensor at the corner of the elastic plate. The touch signal is converted into a time-reversal signal according to the mathematical model by a simulator. The time-reversal signal is reversed to the touched point for simulating reversal vibration waves of the time-reversal signal on the elastic plate, and locating the touched point.

8 Claims, 8 Drawing Sheets

TIME-REVERSAL-BASED IMPACT-LOCALIZATION AND HAPTIC-FEEDBACK METHOD FOR TOUCH PANELS

BACKGROUND OF THE INVENTION

1. Field of the Invention

The present invention relates a technology for touch panels, particularly to a time-reversal-based impact-localization and haptic-feedback method for touch panels.

2. Description of the Related Art

Touch panels may be categorized into the resistive type, the capacitive type, the sonic type, the optical type and the electromagnetic type. When a finger touches the sensor on a touch panel, the sensor sends out an analog signal. A controller converts the analog signal into a digital signal. The driver program of the computer integrates the related components to compile the digital signal. Then, the display card presents a screen signal on the screen to indicate the touched position.

There is a simpler but more precise technology to locate a touched position, called the TR (time-reversal signal processing) method. Firstly, the sensor array records the signal of each point (However, the signal may be affected by noise or reflected signals.) Next, time-reversal mirrors reverse the signal previously recorded to make the waveform automatically converge to the touched point. The TR method functions like a phase-conjugate filter. The TR method provides a delta function as the test signal and maximizes SNR (Signal Noise Ratio). In the conventional TR technology, the touch panel must be trained before it can trace back the touched position. In training a touch panel, the impulse response of each point must be recorded in the database. Further, when one intends to change the resolution of a touch panel, he has to spend time on measuring impulse responses and reconstructing the database.

Accordingly, the present invention proposes a time-reversal-based impact-localization and haptic-feedback method for touch panels to overcome the abovementioned problems. The principles and embodiments thereof are described in detail below.

SUMMARY OF THE INVENTION

The primary objective of the present invention is to provide a time-reversal-based impact-localization and haptic-feedback method for touch panels, which uses an elastic plate theory and a time-reversal method to trace back the position where an external force is applied, and which can fast modify the resolution of touch panels without using any experiment.

Another objective of the present invention is to provide a time-reversal-based impact-localization and haptic-feedback method for touch panels, which utilizes a plate theory to predict the impulse response of an elastic plate, neither spending time on experiments nor using massive memory.

To achieve the abovementioned objectives, the present invention proposes a time-reversal-based impact-localization and haptic-feedback method for touch panels, which comprises steps: constructing a plate model of an elastic plate according to a plate theory; calculating the impulse response of an arbitrary point on the elastic plate; using a time-reversal method to construct a mathematical model according to the impulse responses; using sensors arranged on the corners of the elastic plate to receive a touch signal generated by applying an external force on a point of the elastic plate; using a simulator to convert the touch signal into a time-reversal signal according to the mathematic model and retransmit the time-reversal signal back to the touched point to simulate the waveform of backward propagation vibration on the elastic plate and locate the touched point.

Below, the embodiments are described in detail to make easily understood the objectives, technical contents, characteristics and accomplishments of the present invention.

DETAILED DESCRIPTION OF THE INVENTION

Figure 1:
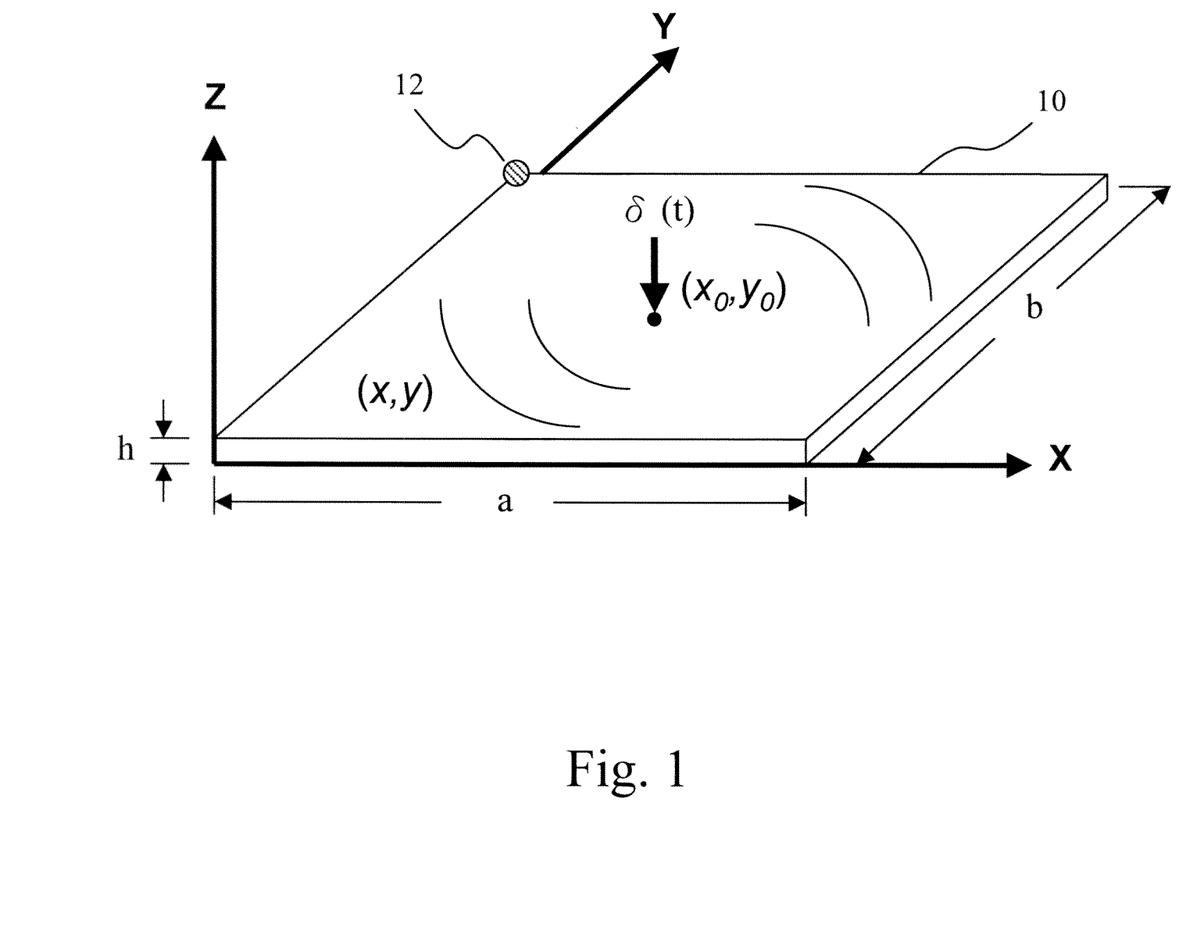
FIG. 1 is a diagram schematically showing a bending wave generated via applying an external force on an elastic plate.

The present invention proposes a time-reversal-based impact-localization and haptic-feedback method for touch panels. Refer to FIG. 1 for a bending wave generated via applying an external force on an elastic plate 10 having uniform thickness. The elastic plate 10 is made of glass, acrylic or a non-rigid material. At least one sensor 12 is arranged at a corner of the elastic plate 10, receiving and virtually retransmitting the bending wave signal to obtain the touched point. The sensor 12 may be a piezoelectric sensor or a voice-coil sensor.

Figure 2:
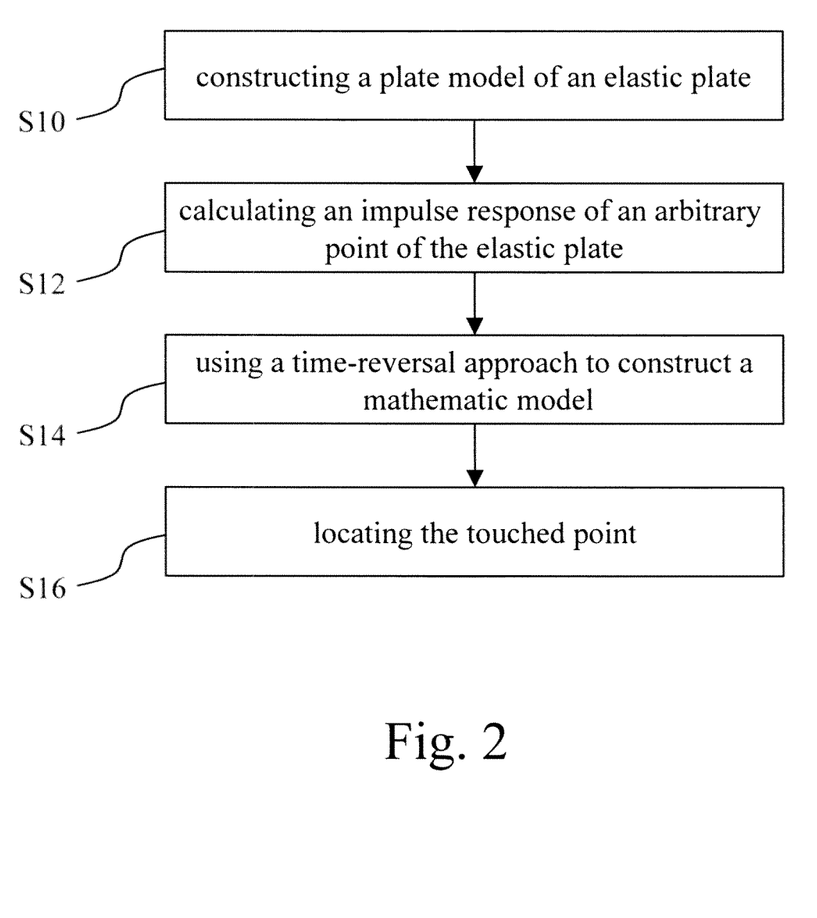
FIG. 2 is a flowchart of a time-reversal-based impact-localization and haptic-feedback method according to the present invention.

Refer to FIG. 2 for a flowchart of a time-reversal-based impact-localization and haptic-feedback method according to the present invention. Suppose that the elastic plate 10 has a thickness of h and that h is shorter that the wavelength of the bending wave. In Step S10, work out a transversal displacement equation w(x, y t), i.e. a plate model describing the vibration of the elastic plate 10 when force is applied to the elastic plate 10, from Equation (1):

$$D\nabla^4 w + \rho h \ddot{w} = \delta(t)\delta(x-x_0)\delta(y-y_0) \qquad (1)$$

wherein the non-homogeneous terms $\delta(t)\delta(x-x_0)\delta(y-y_0)$ is the unit impulse, $\rho$ the density of the elastic plate 10, w the transversal displacement, h the thickness of the elastic plate 10, and $(x_0, y_0)$ the touched point, and
wherein D is the bending stiffness per unit length and expressed by $$D = \frac{Eh^3}{12(1-v^2)} \qquad (2)$$

wherein E and $v$ are respectively the Young's modulus and Poisson ratio of the elastic plate 10.

Suppose that the initial state of the transversal displacement is expressed by $$w(x,y,0) = \dot{w}(x,y,0) = 0 \qquad (3)$$

wherein $w_0(x, y)$ denotes the initial position of the elastic plate 10. Thus is worked out the transversal displacement equation (the plate model) expressed by $$w(x, y, t) = \sum_{m=1}^{\infty} \sum_{n=1}^{\infty} \frac{4}{\Omega_{mn}abh\rho} \sin\frac{m\pi x}{a} \sin\frac{n\pi y}{b} \sin\frac{m\pi x_0}{a} \sin\frac{n\pi y_0}{b} \sin(\Omega_{mn}t) \quad (4)$$

wherein $$\Omega_{mn} = \sqrt{\frac{D}{\rho h}} \left[ \left(\frac{m\pi}{a}\right)^2 + \left(\frac{n\pi}{b}\right)^2 \right],$$

and wherein a and b are respectively the length and width of the elastic plate 10.

In Step S12, work out a plate model of the elastic plate 10 and the impulse response thereof according to the Kirchoff plate theory. Next, in Step S14, use a time-reversal method to construct a mathematical model (expressed by Equation (6)) to convert the touch signal received by the sensor into a time-reversal signal, and retransmit the time-reversal signal to the touched point to simulate a waveform of backward propagation vibration. In Step S16, locate the touched point. Steps S12-S16 are described in detail below.

The non-homogeneous terms in Equation (1) is the unit impulse, and Equation (4) provides the solution for the impulse response between the touched point $(x_0, y_0)$ and an arbitrary point $(x, y)$ at the elastic plate 10. Suppose that the force applied to the elastic plate 10 is $r_l(t)$, $l=1, 2, \ldots, L$, L is the number of the sensor 12. Convolution is used to calculate the impulse response $d_i(t)$ of the ith point and the transverse displacement of an arbitrary response point i according to Equations (5) and (6):

$$d_i(t) = \sum_{l=1}^{L} w_{il}(x, y, t) \otimes r_l(t) \quad (5)$$

$$w_{il}(x, y, t) = \sum_{m=1}^{\infty} \sum_{n=1}^{\infty} \frac{4}{\Omega_{mn}abh\rho} \sin\frac{m\pi x_i}{a} \sin\frac{n\pi y_i}{b} \sin\frac{m\pi x_l}{a} \sin\frac{n\pi y_l}{b} \sin(\Omega_{mn}t) \quad (6)$$

wherein ⊗ is the linear time convolution, and i is the number of the touchable points on the elastic plate 10. Equation (5) is not the result of a single sensor 12 but the sum of the results of all the sensors 12. $r_l(t)$ is regarded as a time-reversal signal and spread out. The spreading is simulated in a simulator (not shown in the drawings). The virtual time-reversal signal is emitted from the sensor 12, and Equation (6) is used to simulate the feedback-induced vibration of the elastic plate 10. The response point having the maximum transverse displacement is worked out via calculation to determine the original touched point $\hat{i}$, which is expressed by $$\hat{i} = \underset{i}{\mathrm{argmax}} \left\{ \max_t [d_1(t), \ldots, d_i(t), \ldots, d_l(t)] \right\}. \quad (7)$$

Figure 3A:
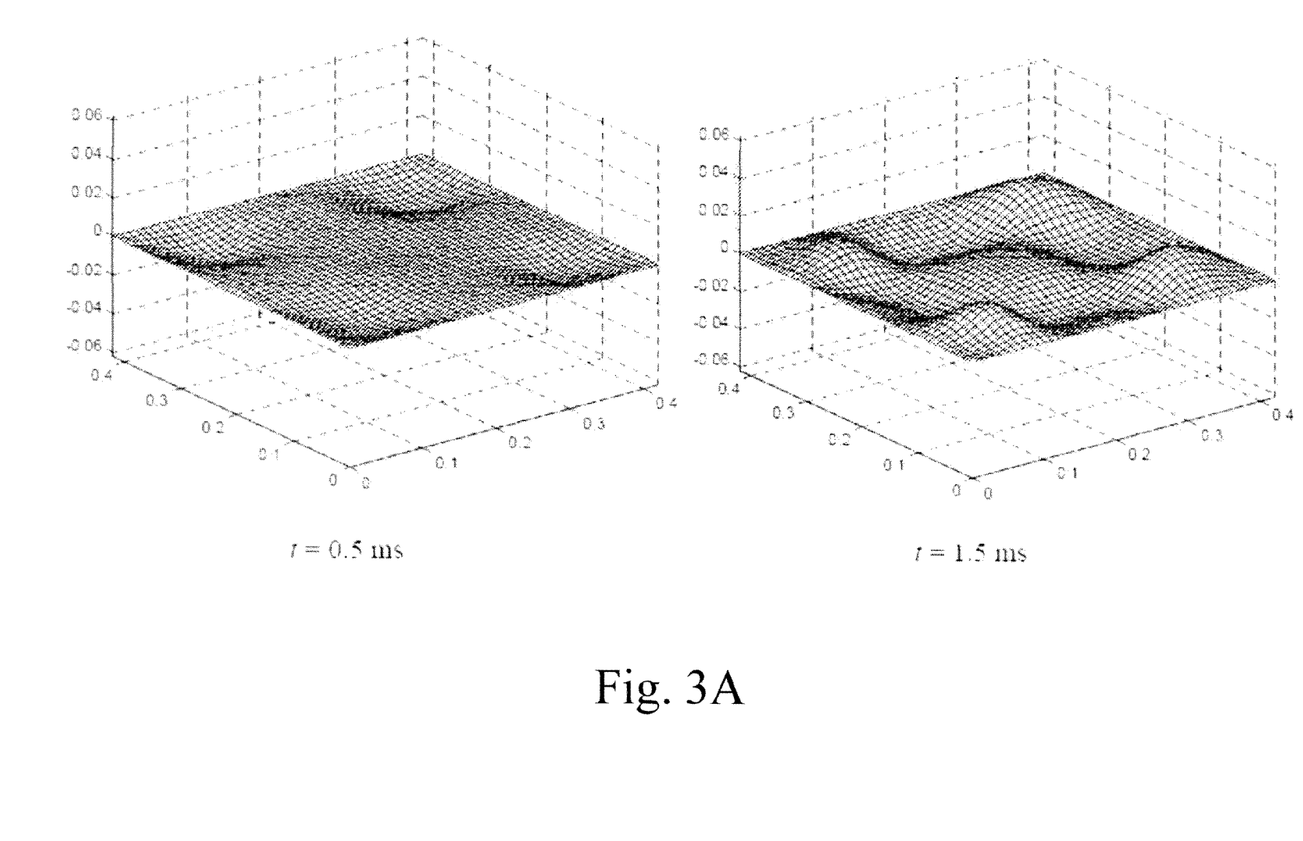
FIGS. 3A-3C are diagrams schematically showing the waveforms respectively obtained via simulating the time-reversal signals of different time points according to one embodiment of the present invention.
Figure 3B:
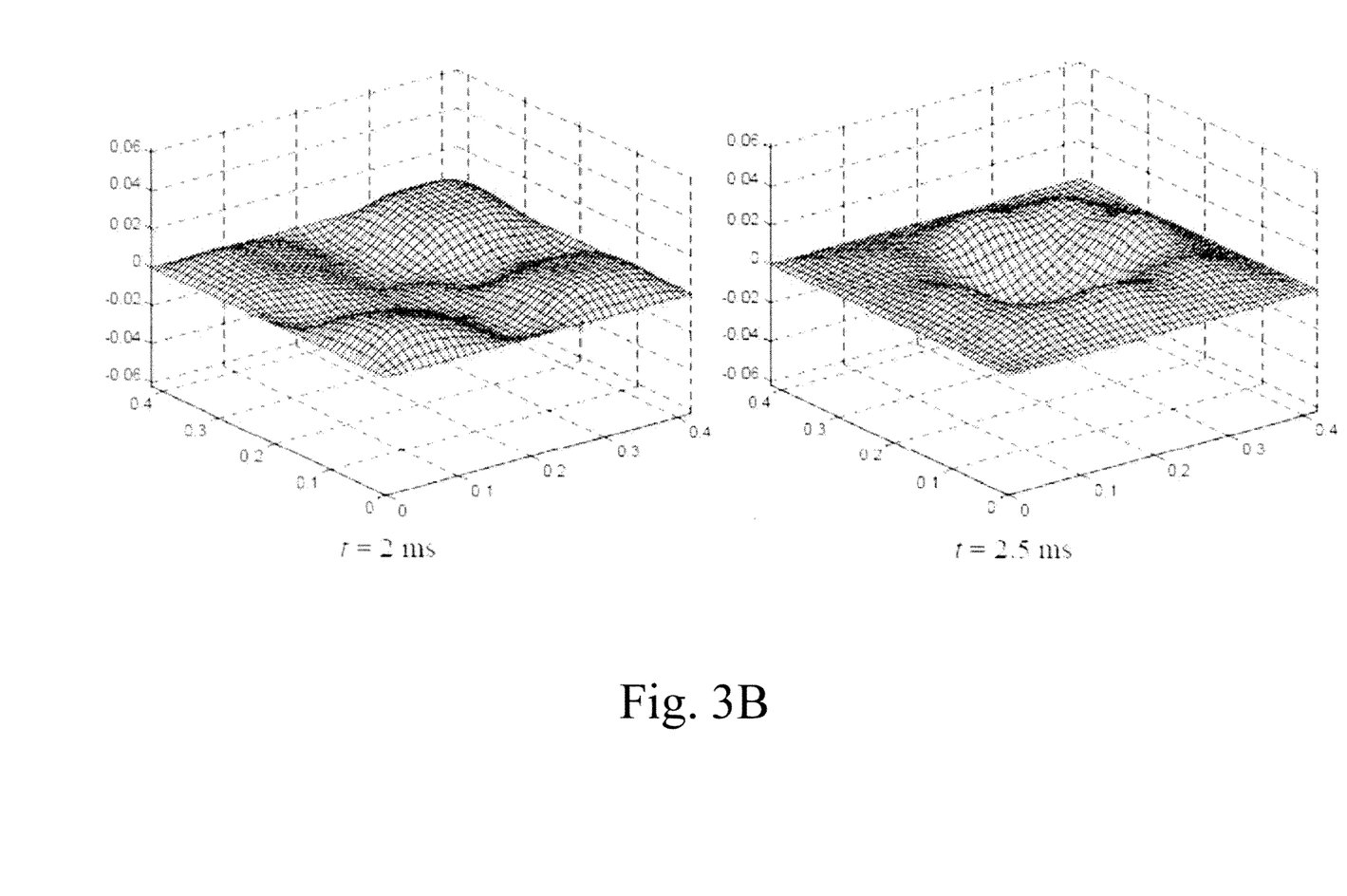
Figure 3C:
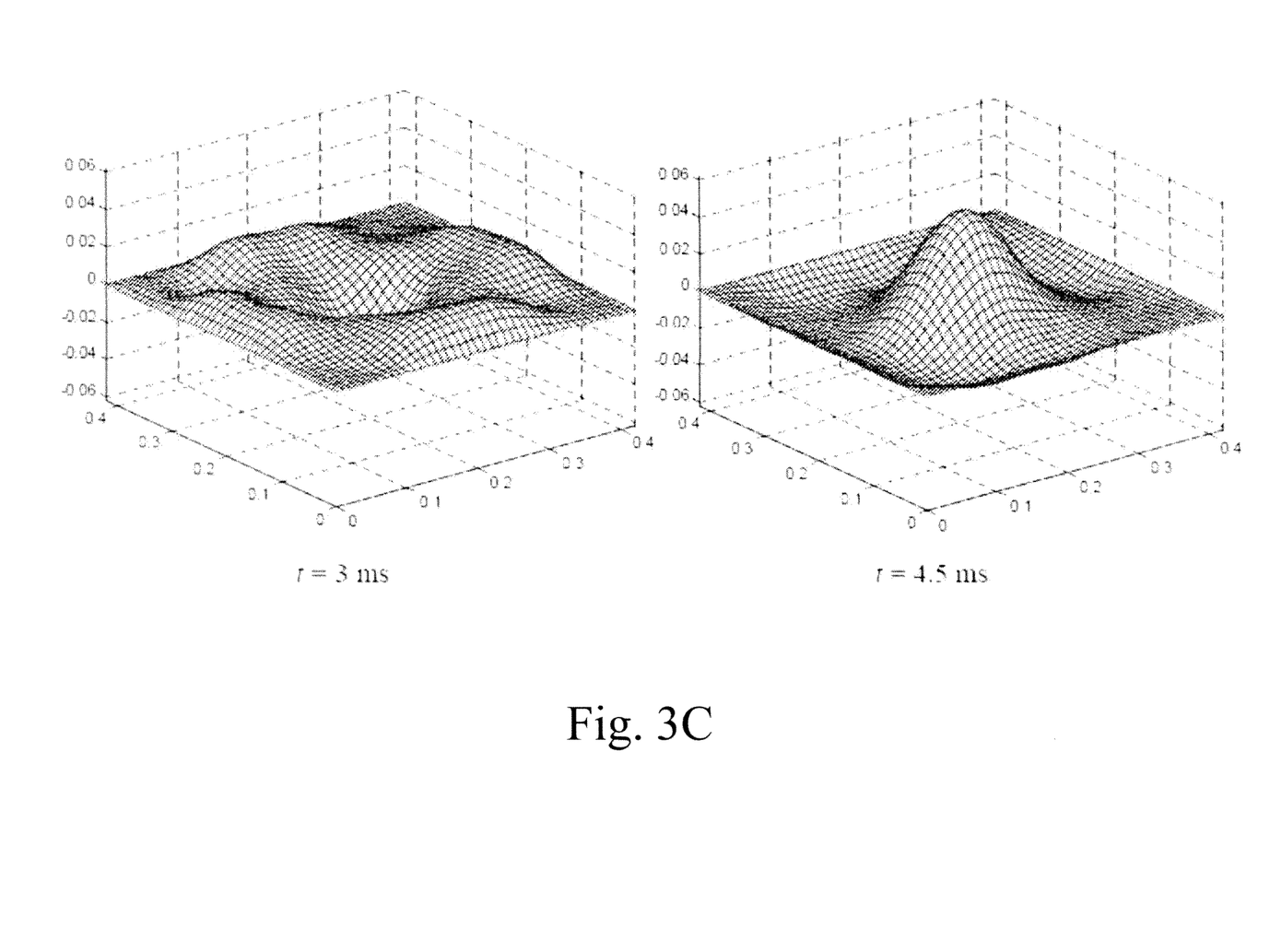
Figure 4A:
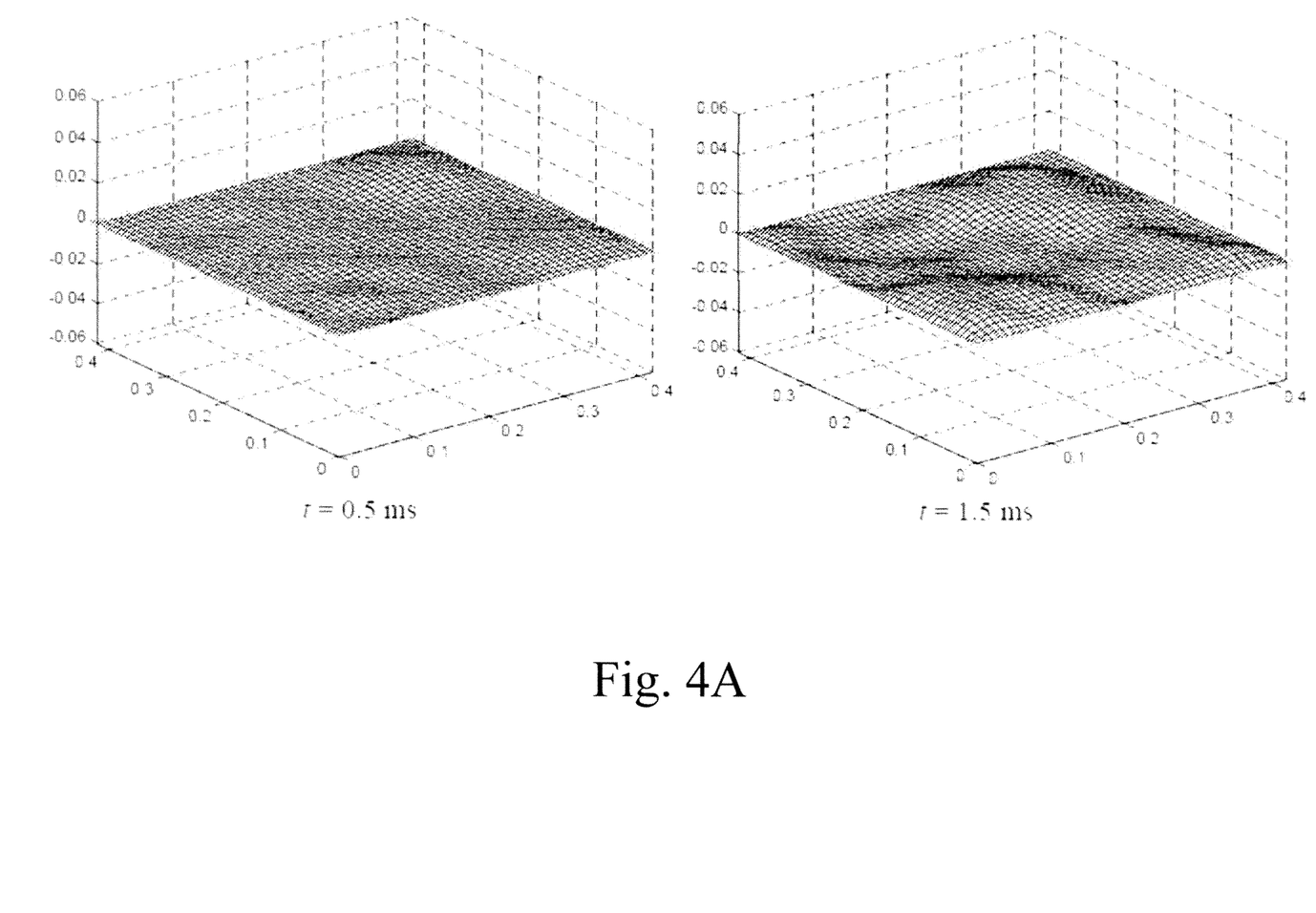
FIGS. 4A-4C are diagrams schematically showing the waveforms respectively obtained via simulating the time-reversal signals of different time points according to another embodiment of the present invention.
Figure 4B:
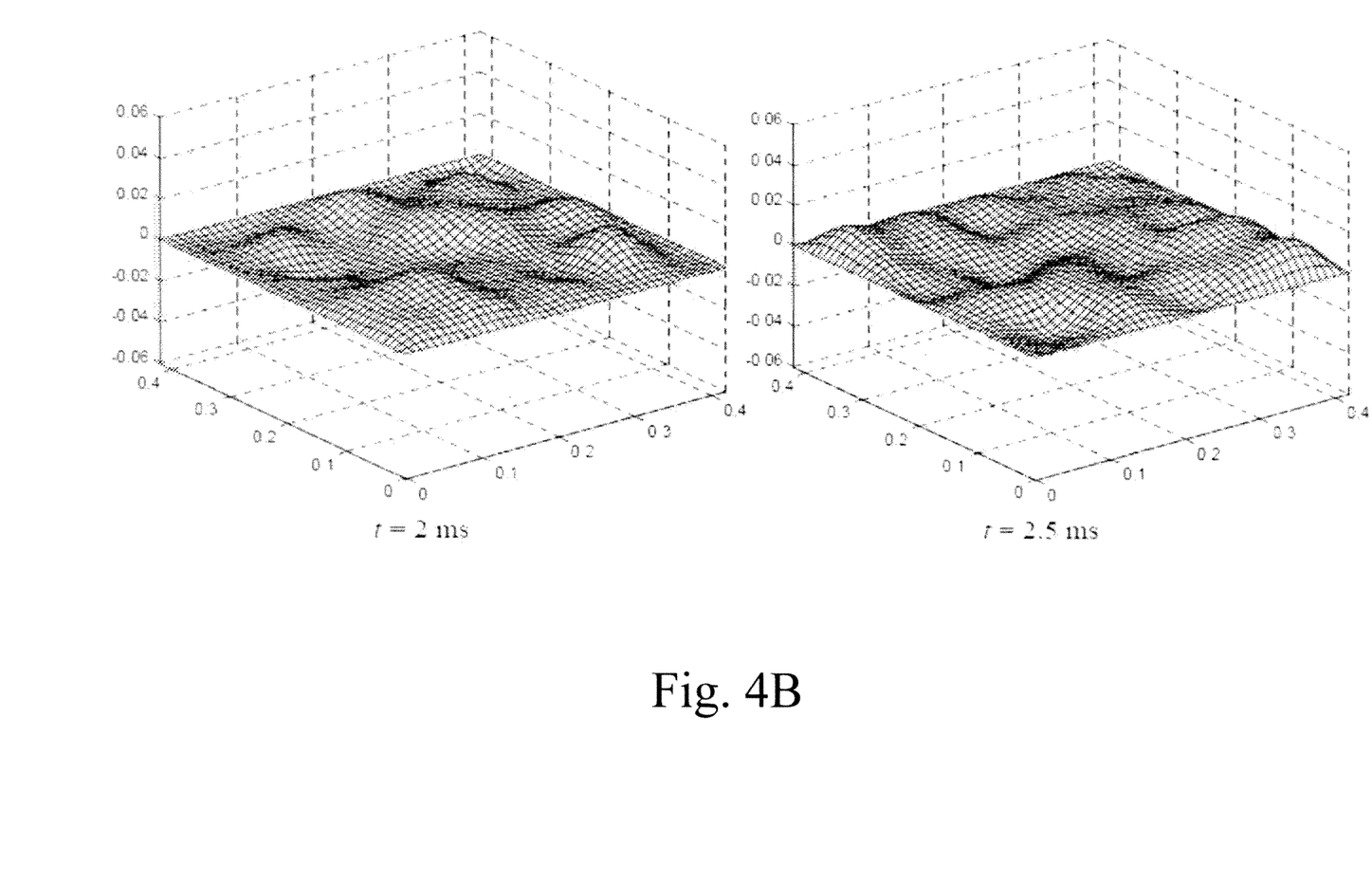
Figure 4C:
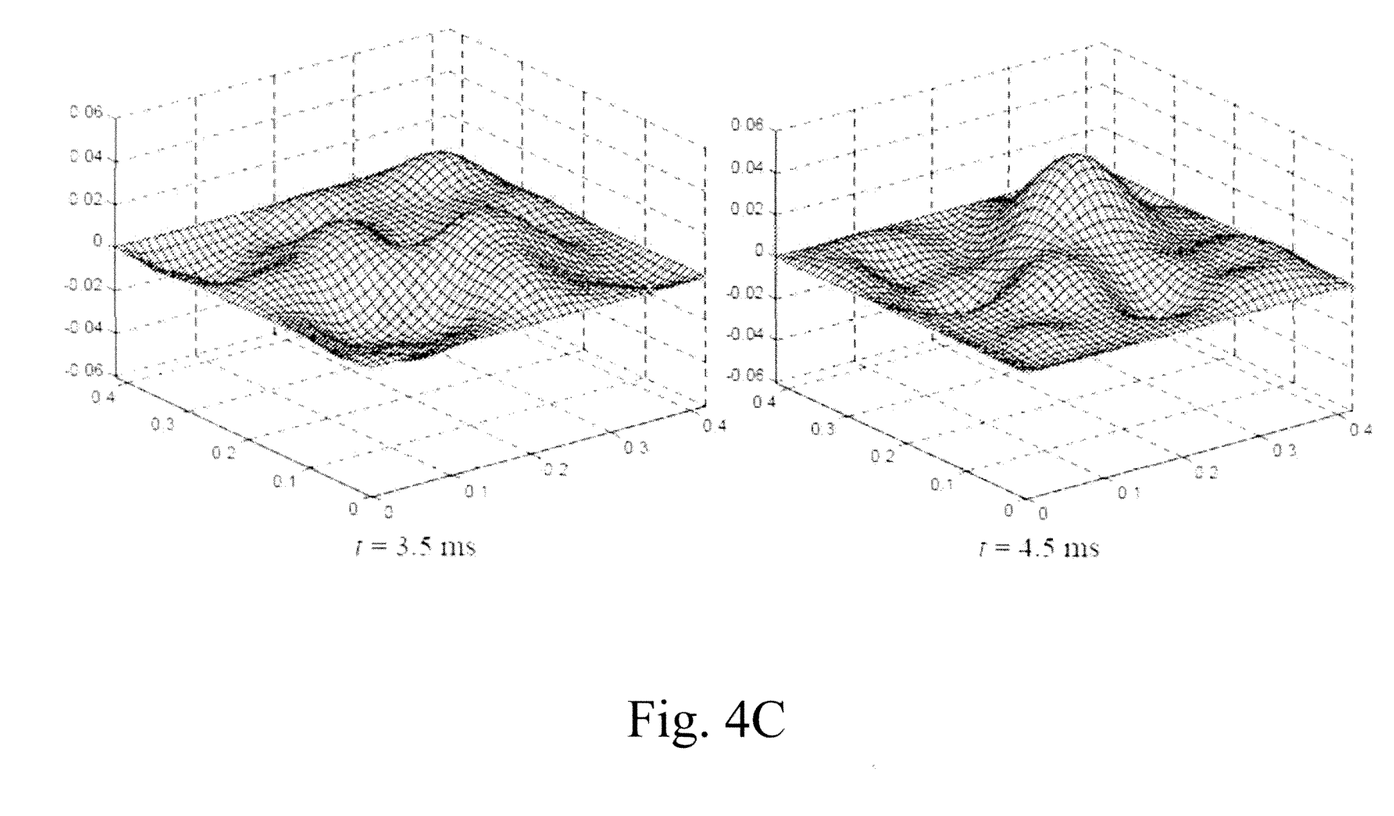

FIGS. 3A-3C schematically show the waveforms obtained via simulating the time-reversal signals of different time points. In the embodiment, the dimensions of the elastic plate 10 is 0.42 m×0.42 m×0.002 m, E=73 GPa, ν=0.2, ρ=2250 kg/m³, and the touched point (0.21, 0.21) is at the center of the elastic plate 10. When the time-reversal signals are emitted, the waveforms gradually spread toward the center from 0.5 ms to 1.5 ms. At the time point of 2.5 ms, the sum of the four waveforms is concaved at the center. At the time point of 4.5 ms, a peak appears at the center, as shown in FIG. 3C. The point having the maximum transverse displacement is the original touched point. FIGS. 4A-4C schematically show another group of waveforms obtained via simulating the time-reversal signals of different time points. In this embodiment, the touched point is (0.26, 0.26). At the time point of 4.5 ms, there is a maximum transverse displacement appearing at the original touched point. The simulation results show that the present invention can use the time-reversal method to find out a touched point even though the touched point is not at the center.

In conclusion, the present invention proposes a time-reversal-based impact-localization and haptic-feedback method for touch panels, wherein theoretical impulse response is derived from an elastic plate theory, and wherein the impulse response is used to generate corresponding forward-propagation vibration to precisely locate the touched position according to the time-reversal approach that outperforms in dealing with broadband sources and reverberant environments.

The embodiments described above are only to exemplify the present invention but not to limit the scope of the present invention. Any equivalent modification or variation according to the characteristics or spirit of the present invention is to be also included within the scope of the present invention.

What is claimed is:

1. A time-reversal-based impact-localization and haptic-feedback method for touch panels, comprising steps:

constructing a plate model of an elastic plate according a plate theory, wherein said plate model is constructed according to a plurality of material parameters of said elastic plate, including thickness, unit impulse density and bending stiffness, Young's modulus, and a Poisson ratio of said elastic plate;

calculating an impulse response $d_i(t)$ of an arbitrary point i of said elastic plate in accordance with:

$$d_i(t) = \sum_{l=1}^{L} w_{il}(x, y, t) \otimes r_l(t),$$

wherein ⊗ is the linear time convolution, i is the number of the touchable points on the elastic plate, $r_l(t)$ is the force applied to the elastic plate, wherein l=1, 2, . . . , L, wherein L is the number of a sensor, and $w_{il}(x,y,t)$ is the transfersal displacement of said arbitrary point i described by said plate model $d_i(t)$;

using a time-reversal approach to construct a mathematic model according to said impulse response;

using at least one sensor at a corner of said elastic plate to receive a touch signal generated via applying an external force to a touched point of said elastic plate; and using a simulator to convert said touch signal into as thine-reversal signal according to said time-reversal approach and retransmit said time-reversal signal emitted by said at least one sensor to said touched point to simulate a waveform of backward-propagation vibration and position said touched point, wherein said feedback-induced vibration is simulated in accordance with $$w_{il}(x, y, t) = \sum_{m=1}^{\infty} \sum_{n=1}^{\infty} \frac{4}{\Omega_{mn}abh\rho} \sin\frac{m\pi x_i}{a} \sin\frac{n\pi y_i}{b} \sin\frac{m\pi x_l}{a} \sin\frac{n\pi y_l}{b} \sin(\Omega_{mn}t).$$

wherein ρ is the density of the elastic plate, w is the transversal displacement, h is the thickness of the elastic plate, $(x_0, y_0)$ is the touched point, and wherein D is the bending stiffness per unit length expressed by $$D = \frac{Eh^3}{12(1-v^2)},$$

wherein E and v are the Young's modulus and Poisson ratio of the elastic plate, respectively, and wherein $$\Omega_{mn} = \sqrt{\frac{D}{\rho h}}\left[\left(\frac{m\pi}{a}\right)^2 + \left(\frac{n\pi}{b}\right)^2\right],$$

wherein a and b are the length and width of the elastic plate, respectively.

2. The time-reversal-based impact-localization and haptic-feedback method for touch panels according to claim 1, wherein said plate model is an equation describing transverse displacement of said elastic plate receiving external force.

3. A time-reversal-based impact-localization and haptic-feedback method for touch panels according to claim 1, wherein a convolution operation is used to work out said impulse response according to a count of said sensors and a count of said touched points on said elastic plate.

4. The time-reversal-based impact-localization and haptic-feedback method for touch panels according to claim 1, wherein a position having a maximum transverse displacement in said waveform of backward-propagation vibration is said touched point.

5. The time-reversal-based impact-localization and haptic-feedback method for touch panels according to claim 1, wherein retransmitting said time-reversal signal to said touched point generates a haptic feedback that induces said waveform of backward-propagation vibration.

6. The time-reversal-based impact-localization and haptic-feedback method for touch panels according to claim 1, wherein said sensor is a piezoelectric sensor or a voice-coil sensor.

7. The time-reversal-based impact-localization and haptic-feedback method for touch panels according to claim 1, wherein said elastic plate is made of glass, iron, copper or another material.

8. The time-reversal-based impact-localization and haptic-feedback method for touch panels according to claim 1, wherein said plate theory is the Kirchoff plate theory.

* * * * *